(12) United States Patent
Flöther et al.

(10) Patent No.: US 11,822,533 B2
(45) Date of Patent: Nov. 21, 2023

(54) KNOWLEDGE GRAPH UPDATE USING CHANGE LAYERS

(71) Applicant: INTERNATIONAL BUSINESS MACHINES CORPORATION, Armonk, NY (US)

(72) Inventors: Frederik Frank Flöther, Schlieren (CH); Stefan A. G. Van Der Stockt, Austin, TX (US); Erik Rueger, Ockenheim (DE); Matthias Biniok, Marburg (DE); Maximilian Ott, Creglingen (DE)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 17/457,073

(22) Filed: Dec. 1, 2021

(65) Prior Publication Data

US 2023/0169059 A1 Jun. 1, 2023

(51) Int. Cl.
*G06F 16/23* (2019.01)
*G06N 20/00* (2019.01)
*G06F 16/901* (2019.01)

(52) U.S. Cl.
CPC .......... *G06F 16/23* (2019.01); *G06F 16/9024* (2019.01); *G06N 20/00* (2019.01)

(58) Field of Classification Search
CPC ............................ G06F 16/23; G06F 16/9024
See application file for complete search history.

(56) References Cited

U.S. PATENT DOCUMENTS

| 8,972,340 | B1* | 3/2015 | Haase | G06F 16/113 |
| | | | | 707/827 |
| 10,678,857 | B2 | 6/2020 | Scheideler | |
| 2015/0154262 | A1* | 6/2015 | Yang | G06F 16/2358 |
| | | | | 707/649 |
| 2018/0052884 | A1 | 2/2018 | Kale | |
| 2020/0280564 | A1* | 9/2020 | Badawy | H04L 63/102 |

(Continued)

FOREIGN PATENT DOCUMENTS

WO 2019159056 A1 8/2019

OTHER PUBLICATIONS

Bharath, "Concise Guide to Unsupervised Learning With Clustering!," TowardsDataScience.com, Oct. 14, 2020, 15 pgs.

(Continued)

*Primary Examiner* — Grace Park
(74) *Attorney, Agent, or Firm* — Jordan T. Schiller

(57) ABSTRACT

A computer-implemented method for managing updates to a knowledge graph with incoming change requests is disclosed. The method comprises creating a snapshot of the knowledge graph, building sub-regions of the knowledge graph, classifying each incoming change to the knowledge graph so that it relates to one of the sub-regions, creating at least one change layer, wherein each of the at least one change layer relates to one of the sub-regions, wherein each of the at least one change layer comprises a portion of the incoming change requests, closing the at least one change layer upon reaching a predetermined threshold value for the at least one change layer, and integrating the at least one change layer into the knowledge graph, thereby generating a updated knowledge graph.

18 Claims, 8 Drawing Sheets

(56) References Cited

U.S. PATENT DOCUMENTS

2020/0379752 A1* 12/2020 Rodrigues Rosa Junior ............... G06F 16/9014
2021/0019354 A1* 1/2021 Mallick .................... G06N 5/04

OTHER PUBLICATIONS

Comet, "Clustering Knowledge Graphs (Seminar Paper)," ResearchGate, Mar. 2019, 13 pgs.

Das, et al., "Building Dynamic Knowledge Graphs from Text Using Machine Reading Comprehension," Published as a Conference Paper at ICLR 2019, 12 pgs.

Disclosed Anonymously, "Reasoning System and Method to Automatically Maintain Knowledge Graphs Based on Semantic Changes," IP.com Prior Art Database Technical Disclosure, IP.com No. IPCOM000264201D, Nov. 20, 2020, 8 pgs.

Jukna, "On Graph Complexity," Cambridge University Press, Combinatorics, Probability and Computing, vol. 15, Issue 6, Aug. 16, 2006, 24 pgs.

Mell et al., "The NIST Definition of Cloud Computing", National Institute of Standards and Technology, Special Publication 800-145, Sep. 2011, pp. 1-7.

Mishra, et al., "Time-Critical Search," SIGIR '14, Jul. 6-11, 2014, ACM, 10 pgs.

Pasqual, et al., "Multilayer Network Model for Analysis and Management of Change Propagation," Research Engineering Design , Dec. 7, 2011, Springer-Verlag, 24 pgs.

Raval, et al., "Dynamic Load Balancing Strategies for Graph Applications on GPUs," arXiv:1711.00231v1 [cs.DC], Nov. 1, 2017, 11 pgs.

Stackexchange, "Measure Graph Complexity," Cross Validated, [accessed Oct. 12, 2021], 5 pgs., Retrieved from the Internet: <https://stats.stackexchange.com/questions/239652/measure-graph-complexity>.

Trivedi, et al., "Know-Evolve: Deep Temporal Reasoning for Dynamic Knowledge Graphs," Proceedings of the 34th International Conference on Machine Learning, PMLR 70, 2017, 10 pgs.

Wang, et al., "A Novel Time Constraint-Based Approach for Knowledge Graph Conflict Resolution," Applied Sciences, 2019, 9, 4399, Oct. 17, 2019, MDPI, 13 pgs.

Wu, et al., "Efficiently Embedding Dynamic Knowledge Graphs," arXiv:1910.06708v1 [cs.DB], Oct. 15, 2019, 14 pgs.

Xu, et al., "Temporal Knowledge Graph Embedding Model Based on Additive Time Series Decomposition," arXiv:1911.07893v6 [cs.LG], Oct. 28, 2020, 17 pgs.

Zenil, et al., "A Review of Graph and Network Complexity from an Algorithmic Information Perspective," Entropy, Jul. 25, 2018, MDPI, 15 pgs.

* cited by examiner

100

| 102 | creating a snapshot of the knowledge graph |

| 104 | building sub-regions of the knowledge graph |

| 106 | classifying incoming change request |

| 108 | creating at least one change layer |

| 110 | closing the change layer |

| 112 | integrating the change layer |

KNOWLEDGE GRAPH UPDATE USING CHANGE LAYERS

BACKGROUND

The present invention relates generally to the field of computing, and more particularly to updating a knowledge graph by managing updates for the knowledge graph with incoming change requests.

While managing and organizing the ever-growing amount of data in enterprises as well as in public organizations, knowledge graphs have been proven to be a helpful tool for consistently storing and managing large amounts of unstructured, as well as structured, data, and the relationships between the data. In knowledge graphs, the data may be highly connected through a node relations system.

Even if knowledge graphs are designed for large amounts of data, a large amount of data may mean higher costs, both financially and in terms of computing performance. Therefore, efficiently managing updates of a knowledge graph with new data or eliminating redundant or no longer required data, in an efficient way, may become an urgent requirement. Traditionally, knowledge graphs may have been updated using a naïve first-in/first-out approach. Some preprocessing may have been done in order to normalize the data. Furthermore, many knowledge graphs may not provide the ability to efficiently store and maintain the history of information and often provide little in terms of version history. Therefore, efficiently tracking updates to the knowledge graph over time may require an expensive change in the storage schema of the knowledge graph.

Hence, it may be a necessary in the industry to optimize the storage requirements needs for historical data and knowledge graphs and to reduce the number of update calls to a knowledge graph.

SUMMARY

According to one aspect of the present invention, a computer-implemented method for managing updates for a knowledge graph with incoming change requests may be provided. The method may comprise creating a snapshot of the knowledge graph, building sub-regions of the knowledge graph, classifying each incoming change to the knowledge graph so that it relates to one of the sub-regions, and creating at least one change layer, wherein each of the at least one change layers relates to one of the sub-regions, wherein each of the at least one change layers may comprise a portion of the incoming change requests.

The method further comprises closing the at least one change layer upon reaching a predetermined threshold value for the at least one change layer, and integrating the at least one change layer into the knowledge graph, thereby generating an updated knowledge graph.

According to another aspect of the present invention, a knowledge graph system for managing updates for a knowledge graph with incoming change requests may be provided. The system comprises a processor and a memory, communicatively coupled to the processor, wherein the memory stores program code portions that, when executed, enable the processor, to create a snapshot of the knowledge graph, build sub-regions of the knowledge graph, and classify each incoming change to the knowledge graph so that it relates to one of the sub-regions.

The processor may also be enabled when executing the stored program code portions to create at least one change layer, wherein each of the at least one change layers may relate to one of the sub-regions, wherein each of the at least one change layers comprises a portion of the incoming change requests, close the at least one change layer upon reaching a predetermined threshold value for the at least one change layer, and integrate the at least one change layer into the knowledge graph, thereby generating an updated knowledge graph.

Furthermore, embodiments may take the form of a related computer program product, accessible from a computer-usable or computer-readable medium providing program code for use by, or in connection with, a computer or any instruction execution system. For the purpose of this description, a computer-usable or computer-readable medium may be any apparatus that may contain a means for storing, communicating, propagating or transporting the program for use by, or in connection with, the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments are described with reference to method claims, whereas other embodiments are described with reference to apparatus (systems), and computer program product claims. However, a person skilled in the art will gather from the above and the following description that, unless otherwise notified, in addition to any combination of features belonging to one type of subject-matter, also any combination between features relating to different subject-matters, for example, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, to which the invention is not limited.

Figure 1:
Figure 1:
Figure 1:
Figure 1:
Figure 1:
Figure 2:
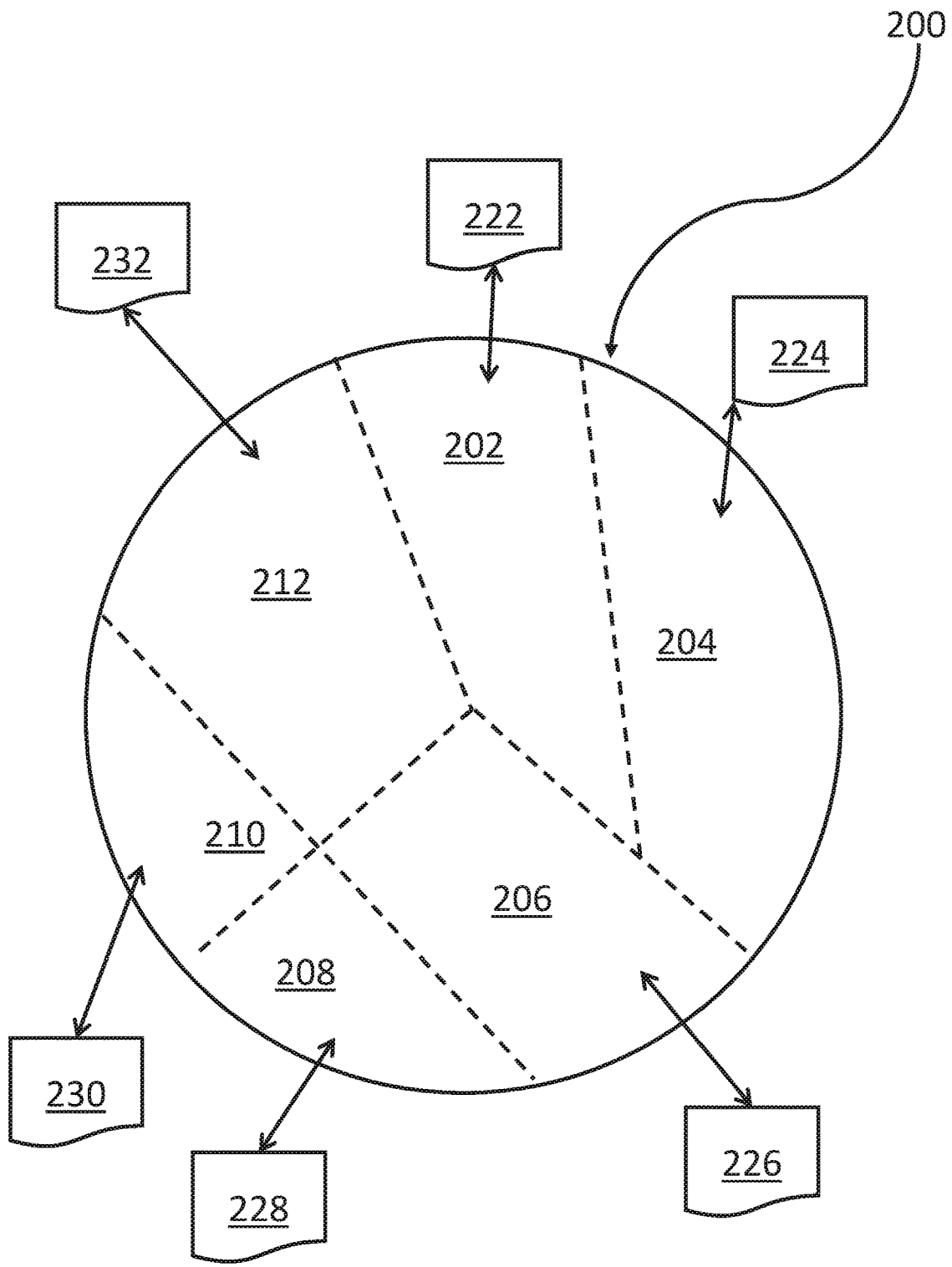
Figure 3:
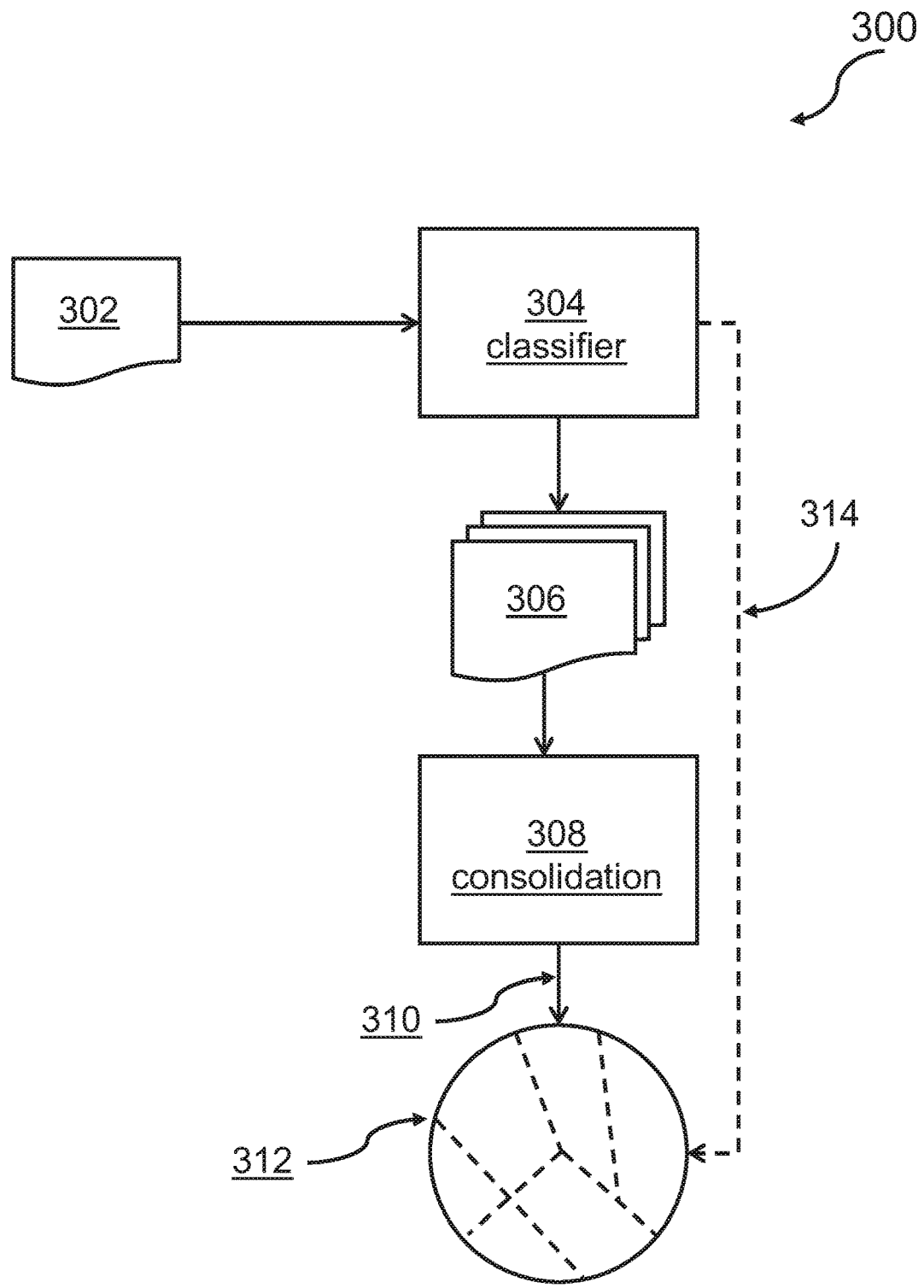
Figure 4:
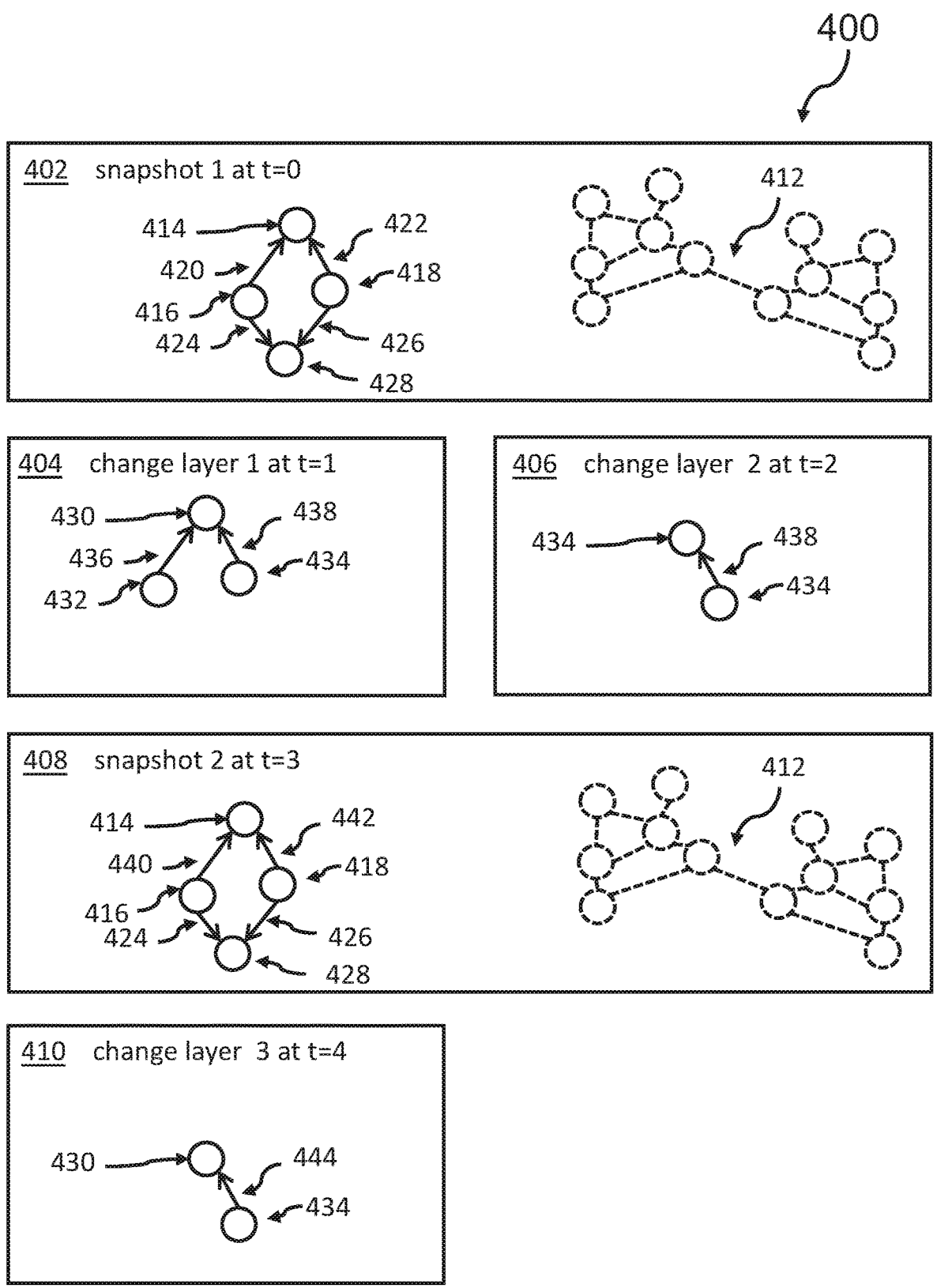
Figure 5:
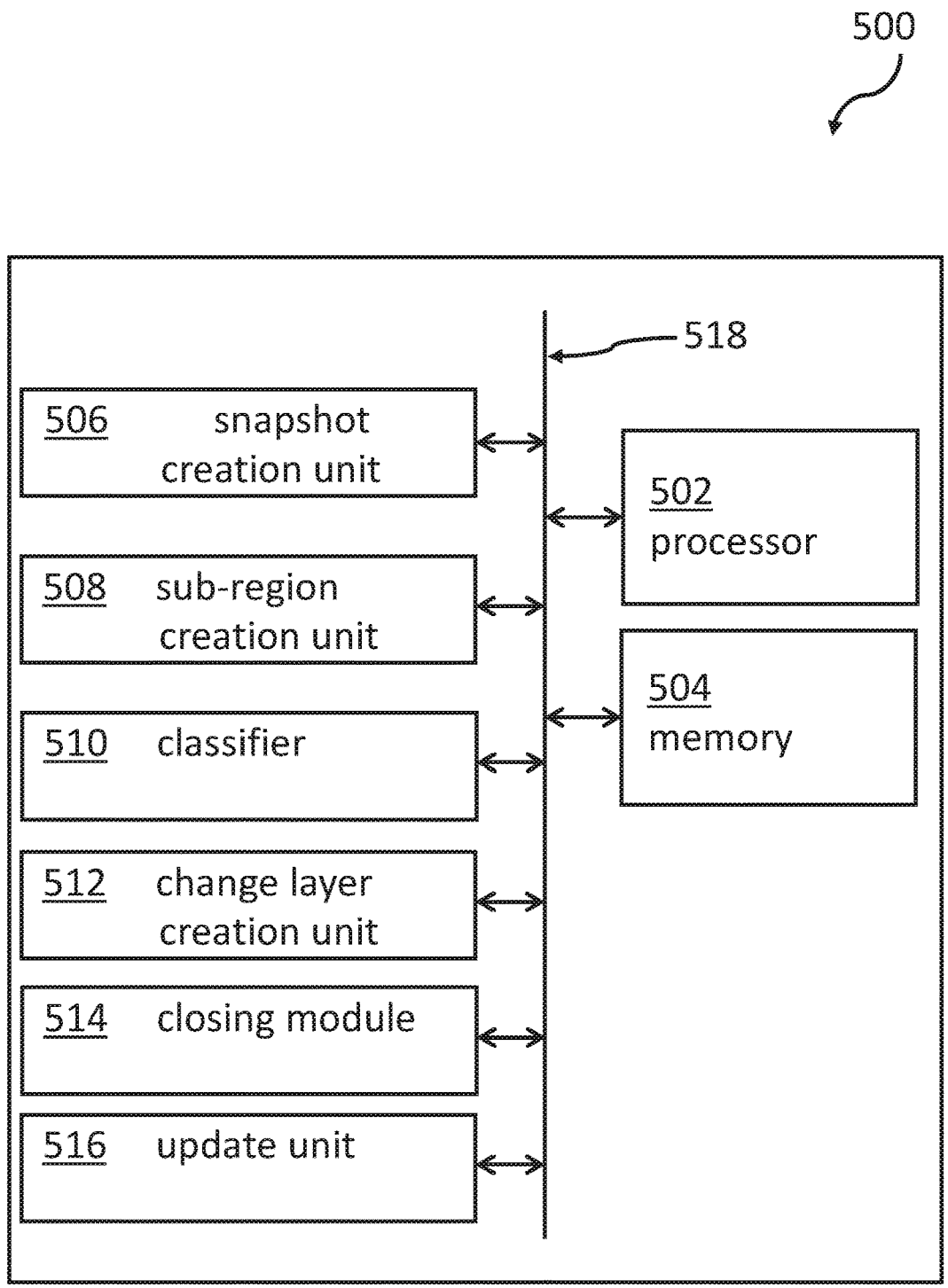
Figure 6:
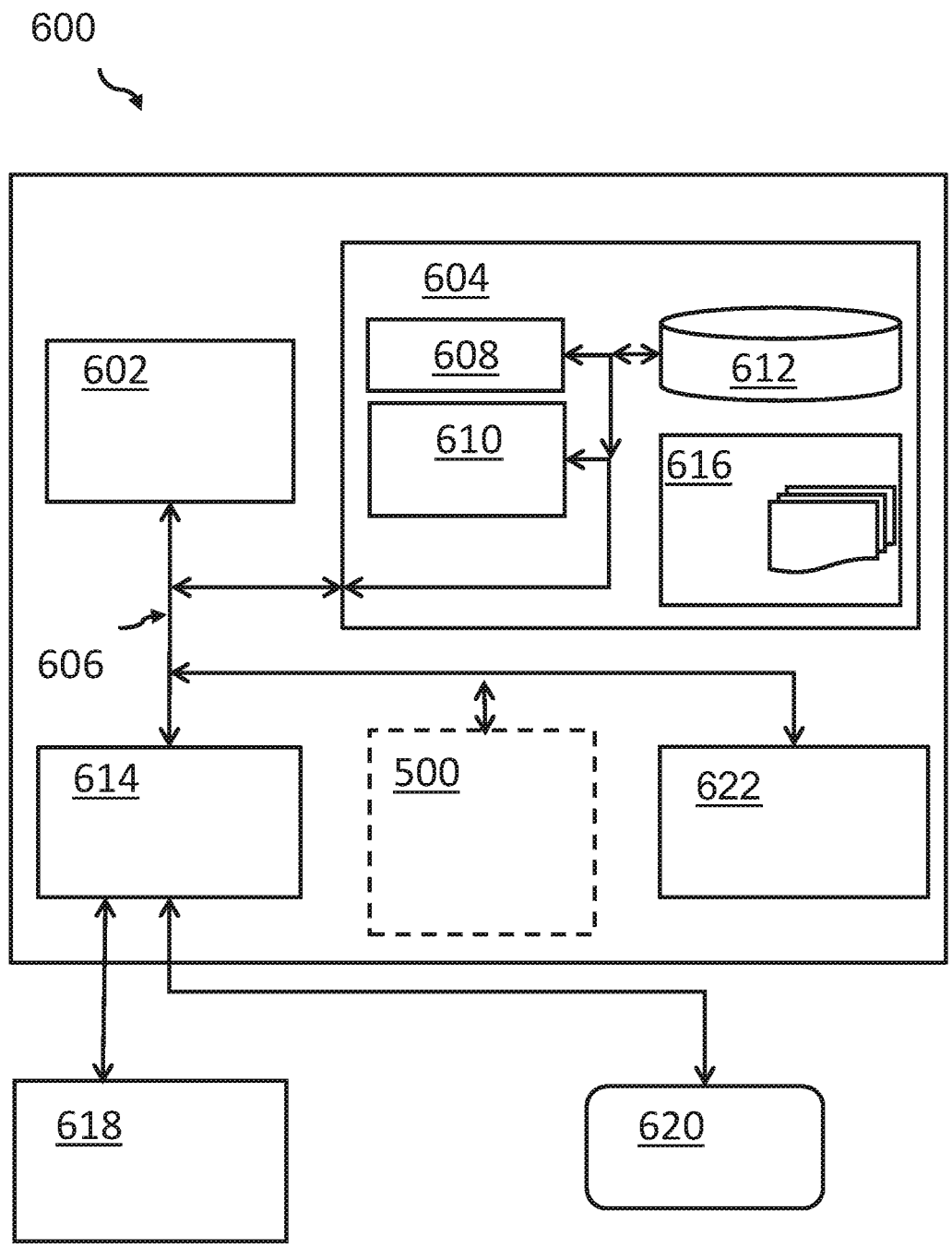

Preferred embodiments of the invention will be described, by way of example only, and with reference to the following drawings:

FIG. 1 is a block diagram of the inventive computer-implemented method for managing updates for a knowledge graph with incoming change requests, according to at least one embodiment;

FIG. 2 is a block diagram illustrating how a knowledge graph can be subdivided into sub-regions, and how the change layers are related to the sub-regions, according to at least one embodiment;

FIG. 3 is a block diagram of a flow from the incoming change requests into the updated knowledge graph, according to at least one embodiment;

FIG. 4 is a block diagram of changes in different stages of the knowledge graph and its change layers;

FIG. 5 is a block diagram of the inventive knowledge graph system for managing updates to a knowledge graph with incoming change requests, according to at least one embodiment; and FIG. 6 is a computing system comprising the system according to FIG. 5, according to at least one embodiment.

Figure 7:
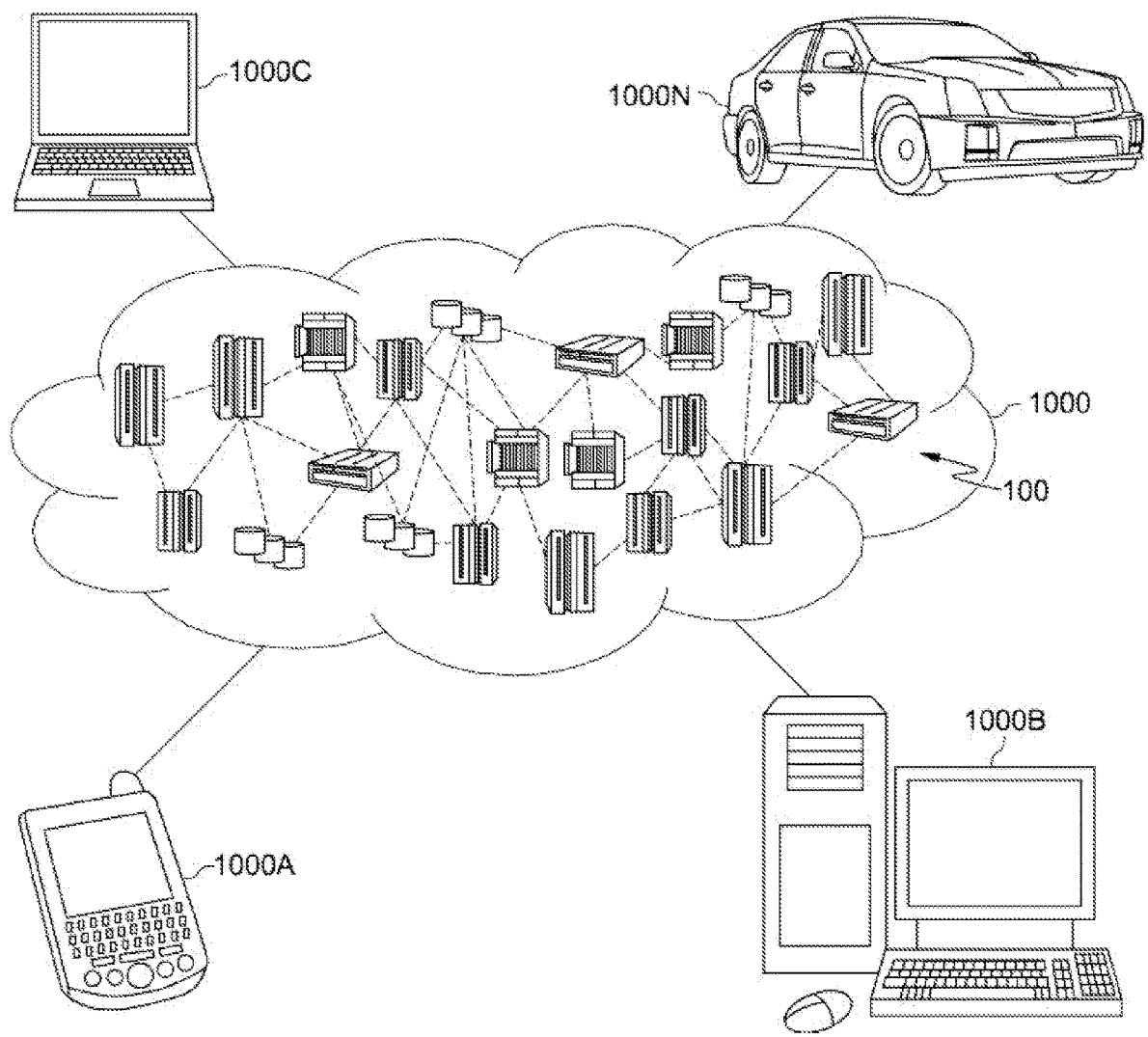

FIG. 7 is a block diagram of an illustrative cloud computing environment, in accordance with an embodiment of the present disclosure.

Figure 8:
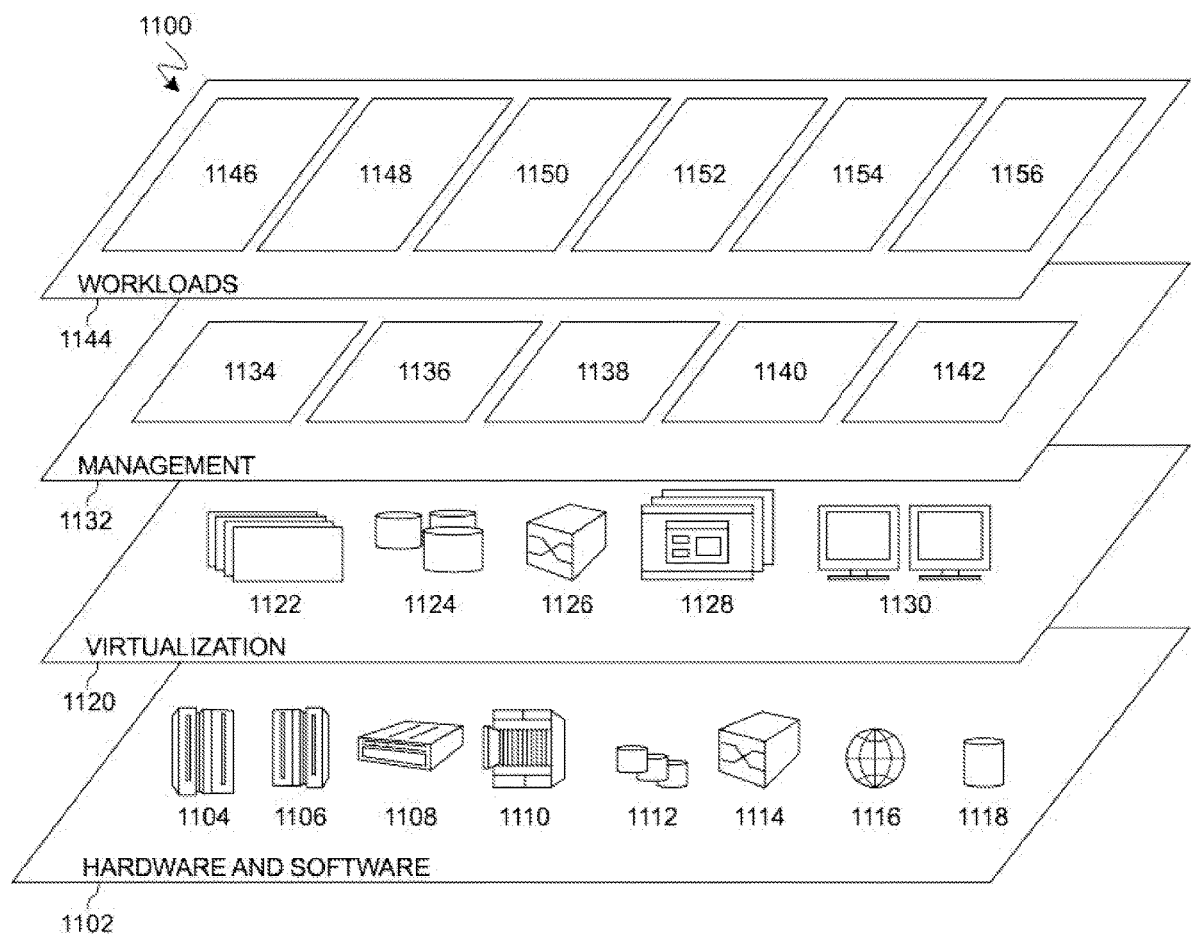

FIG. 8 is a block diagram of functional layers of the illustrative cloud computing environment of FIG. 7, in accordance with an embodiment of the present disclosure.

DETAILED DESCRIPTION

In the context of this description, the following conventions, terms and/or expressions may be used:

The term 'knowledge graph' may denote a special organization of knowledge, facts and/or data in a data store. Facts may be stored in the form of nodes of the knowledge graph, whereas dependencies between dedicated nodes may be stored as relations between the nodes. This may represent a smart and pretty flexible storage architecture for structured, as well as for unstructured data and/or abstract concepts. Furthermore, it may be possible to assign weight factor values to the relationships and to change the meaning of relationships altogether. Knowledge graphs have shown value in supporting search engines as well as organizing data for artificial intelligence systems.

The term 'updates to a knowledge graph' may denote that either a node or a relationship may be changed in the knowledge graph. The change may relate to an ADD, a MODIFY, or a DELETE operation.

The term 'incoming change request' may denote required updates to the knowledge graph. Instead of implementing the change request directly in the knowledge graph, the change may be stored in groups interims-wise.

The term 'snapshot' may denote a frozen status of a stored data structure at a certain point in time. The data structure may be the complete content of the knowledge graph, e.g., including all nodes and edges (which depict relationships) as well as all metadata of the knowledge graph. The latest snapshot may always represent the latest consolidated status of the knowledge graph.

The term 'sub-region' may denote a sub-area of a knowledge graph comprising a certain number of nodes and the nodes' relationships. Several methods may be used to build the sub-regions in a knowledge graph. Relationships between nodes of different sub-regions may exist, thus, crossing boundaries between sub-regions.

The term 'change layer' may denote an intermediary storage for incoming change requests which may not update a related knowledge graph immediately on arrival. Instead, incoming change requests—additions, deletions, and modifications of nodes and/or edges relative to the most recent snapshot or other change layers of this period—may be classified and directed and stored intermediary in one or the other change layer. The stored change requests may later be used to update the knowledge graph in a synchronized fashion. Hence, each change layer may only comprise the changes, but not the original data or other data that was not affected by the changes represented in the change layer.

As a result, instead of duplicating or changing the whole knowledge graph to track changes over time, only the changes may be stored until a new snapshot of the knowledge graph may be created. Between snapshots, there may be one or more change layers. The latest status of the whole knowledge graph may be represented by the latest snapshot plus all applied changes of the change layers between the latest snapshot and the current time stamp. It may also be possible to track expected future changes to the knowledge graph by building future change layers; this may advantageously enable knowledge graph users to query a likely future state of the knowledge graph.

The term 'updated knowledge graph' may denote the knowledge graph after one or more change layers—i.e., the comprised change requests—into an existing knowledge graph. At this stage, a new snapshot may be taken from the knowledge graph.

The proposed computer-implemented method for managing updates to a knowledge graph with incoming change requests may offer multiple advantages, technical effects, contributions and/or improvements:

In general, the concept of using change layers to update the knowledge graph may introduce an approach to optimize storage required for historical data and knowledge graphs and to reduce the number of update calls made to the knowledge graph. This may increase the performance of the knowledge graph itself. The optimized information architecture may also be applicable cross-industry and, may also support the ability to create enhanced AI (artificial intelligence) and machine-learning (ML) models, e.g., in natural language processing (NLP), using this improved information architecture as a basis.

The introduction of change layers may also bring the following advantage: an optimization of data ingestion for high-traffic changes may be enabled. This may become understandable using a comparable example: a ferry should choose intelligent batches to ship as opposed to shipping items one-by-one or via trivial batches.

The proposed concept may also lead to a stability of the knowledge graph and an improved user experience, avoiding x user queries per second which may lead to different answers due to intermediate updates. Instead, the change layers content—i.e., the intermediary stored change request—may be integrated into the knowledge graph at a slower but controlled rate. In one embodiment a maximum time may be defined between updates of the knowledge graph.

Furthermore, a clear version history of changes in the knowledge graph may become trackable. Furthermore, the solution may have optimized data storage requirements and a reduced amount of data that needs to be stored in the knowledge graph. This may also lead to dynamic storage optimization as change layers may be accumulated into consolidated change layers over time. Finally, during an update of the knowledge graph that assigns single change layer update activities to dedicated GPU threads, one may achieve an optimized load balancing during add/change/delete actions on the knowledge graph.

Moreover, the knowledge graph may also be enabled to pre-process change requests within change layers (also across change layers) in order to combine change requests and finally reduce the total number of change requests out of a certain change layer. This may lead to a reduced amount of resulting change requests. And it may also help to optimize resource consumption when managing the knowledge graph.

In the following, additional embodiments of the inventive concept, which may be applicable to the method as well as the system and computer program product claims, will be described.

According to an optional embodiment, the method may also comprise creating an updated snapshot of the updated knowledge graph. This way, three things may be achieved: (i) a fresh status of the updated knowledge graph may be made available for new incoming change requests which may be directed to different change layers; (ii) there may also be a chance to reorganize the subdividing of the sub-regions of the knowledge graph, taking into account the additionally inserted updates to the knowledge graph in the previous cycle; and, (iii) by keeping the snapshots over time, a history of the development of the knowledge graph may be provided without any additional effort.

According to an advantageous embodiment, the method may also comprise consolidating the incoming change requests in the at least one change layers in accordance with a complexity score which may be determined using at least one function argument selected out of the group comprising a number of required changes, a locality value of a change, a mutual dependency of changes, and a historical frequency of changes. This activity may also help to reduce the computational effort required to integrate the received change requests into the larger knowledge graph. If update requests are directed to the same node on the same relationships within the knowledge graph, these may be preprocessed with the information in the change layer(s). If, e.g., within a time period of no update of the knowledge graph a "create item 1," "update item 1," "delete item 1" change request has been received and stored in a change layer, these should not be integrated, modified and deleted within the knowledge graph. Instead, these three change requests may eliminate themselves during a preprocessing or consolidation within a change layer so that the actual larger knowledge graph may not be touched at all (eventually, relationships between items must be reorganized a bit). Many variations of this example may result in the same: some of the change requests may be handled at the level of the change layer without affecting the knowledge graph at all. This may help to reduce the computational costs required for updating the knowledge graph.

Thereby, the term 'in accordance with a complexity score' may also be interpreted as a function using the function arguments mentioned above as input.

Furthermore, a cross change layer preprocessing may be performed before applying the elements of the change layers—i.e., the change requests—to the larger knowledge graph. This may, e.g., be beneficial in terms of multi-lateral updates in the knowledge graph, wherein a portion of the updates relates to one sub-region—i.e., to one change layer—and a part of the number of the upgrade relates to another sub-region—i.e., to another change layer. Also here, other examples may require an equivalent handling.

According to another advantageous embodiment of the method, the integration threshold may comprise at least one out of the group comprising a total number of changes, number of affected nodes and/or edges, number of change layers that exceed the complexity threshold, elapsed time, frequency of changes over time, number of closed layers. Hence, the integration threshold value may define when to start moving some of the change requests of the change layer(s) to the knowledge graph. This could happen trivially once a change may be closed or, it could also be a more complex function based on the integration threshold value.

According to an advanced embodiment of the method, the knowledge graph may be directly updated by a time-sensitive incoming change request or important incoming change request without the use of a change layer. Some rules and policies may exist—e.g., the form of metadata for the nodes and edges of the knowledge graph—as to when to classify an incoming change request as time-sensitive or important. As an example, a certain node in the knowledge graph may be classified as important; hence, an incoming change request to the node or its related edges may not require an intermediary storage in the change layer, but may activate a direct update function for updating the related node or edge of the knowledge graph. Furthermore, it may be possible that the change request itself may comprise metadata initiating the immediate update of the knowledge graph without the usage of a change layer.

According to another technically enhanced embodiment of the method, a determination regarding the time-sensitivity or the importance of the incoming change request may be performed by a trained machine-learning system. This may be a useful feature if it is not per se obvious what a time-sensitive or important update for the knowledge graph is. Past update data from change requests may be used as training data for a machine-learning system in order to develop by training—in particular, by supervised training—a machine-learning model which may be used as reference to predict a requirement for an immediate update outside the regular change layer approach. The advantage here may be that the change to the knowledge graph may be available immediately and that the change request itself may no longer be stored.

According to a further developed embodiment of the method, the sub-regions of the knowledge graph may be built using an unsupervised machine-learning method. The learning system may analyze the knowledge graph—e.g., its nodes, organization, and the relationships/edges—and classify nodes into different sub-regions, e.g., using k-means clustering. This may free the operator of the knowledge graph from the tedious work of finding appropriate sub-regions. Furthermore, the sub-regions grouping may also be made automatically after storing a new snapshot of the knowledge graph. A human operator may be overwhelmed by such a requirement.

According to an interesting embodiment of the method, the consolidation may result in new sub-regions and potentially also new change layers. As a result, the update of the knowledge graph may be better parallelized since the new change layers can be independent from one another with regards to the reorganized sub-regions. This may reduce the computational effort required for the update of the knowledge graph.

According to a permissive embodiment of the method, the consolidation may comprise at least one out of the group comprising merging of change layers, splitting an existing change layer, closing a change layer, and opening a new change layer. Hence, the consolidation may be part of the optimization process underlying the continuous management of the actuality of the knowledge graph.

According to an additional permissive embodiment, the method may also may comprise consolidating the change requests in the at least one change layer comprising at least one function argument selected out of said group comprising merging change requests, splitting a change request, deleting a change request, and creating a change request. This may reduce the number of change requests in the change layer and thus the effort to integrate them into the knowledge graph.

In the following, a detailed description of the figures will be given. All instructions in the figures are schematic. Firstly, a block diagram of an embodiment of the inventive computer-implemented method for managing updates for a knowledge graph with incoming change requests is given. Afterwards, further embodiments, as well as embodiments of the knowledge graph system for managing updates for a knowledge graph with incoming change requests will be described.

FIG. 1 is a block diagram of the inventive computer-implemented method 100 for managing updates for a knowledge graph with incoming change requests, according to at least one embodiment. The method 100 comprises creating a snapshot of the knowledge graph 102, building sub-regions (also denotable as neighborhoods) of the knowledge graph 104, and classifying each incoming change to the knowledge graph so that it relates to one of the sub-regions 106. For this also the locality regarding neighborhood clusters and the type of the change request may be considered.

Furthermore, the method 100 comprises creating at least one change layer 108, wherein each of the at least one change layers relates to one of the sub-regions, wherein each of the at least one change layers comprises a portion of the incoming change requests, closing the at least one change layer upon reaching a predetermined threshold value for the at least one change layer 110, and integrating the at least one change layers into the knowledge graph 112, thereby generating an updated knowledge graph.

FIG. 2 is a block diagram of an embodiment of how a knowledge graph 200—symbolized by a circle—can be subdivided into sub-regions 202 through 212 and how change layers 222 through 232 are related to the sub-regions 202 through 212, according to at least one embodiment. The subdividing of the knowledge graph 200 can be performed according to different rules and policies. It shall mainly depend on a series of parameters like an expected update frequency, in particular of certain regions of the knowledge graph 200, locality of updates, obvious clusters within the knowledge graph 200 and so on. The subdividing can be performed manually or by a preselected algorithm which may also comprise a machine-learning system for auto-classification.

The change layers 222 through 232 are related to the sub-regions 202 through 212. In the change layers 222 through 232, incoming change requests are intermediary stored before they are used to update the knowledge graph 200. The change layers 222 through 232 may be generated as empty shells once the sub-regions 202 through 212 are defined or they will only be created if required, i.e., if a change request has been classified to become part of one of the change layers 222 through 232. It should be understood that each sub-region 202 through 212 of the knowledge graph 200 comprises a plurality of nodes and linking edges (not shown). In a typical case, the subdividing is performed in such a way that only a small or minimum number of edges cross the borders between sub-regions 202 through 212.

FIG. 3 is a block diagram of a flow 300 from the incoming change requests 302 into the updated knowledge graph 312, using the proposed concept, according to at least one embodiment. Firstly, the incoming change requests 302 are classified by the classifier 304 to determine to which of the change layers 306 (c.f., FIG. 2; 222 through 232) they should be assigned to. Once it is determined that the change layers 222 through 232, which store intermediary the incoming change requests 302 selectively, shall be integrated into the knowledge graph—i.e., used to update the knowledge graph—a consolidation 308 is executed before the change requests of the change layers 306 are applied, 310, to build the updated knowledge graph 312.

It may also be possible to side-track, 314, the regular update path of the intermediary storage of the change requests 302 in the change layers 306. For this, the classifier 304 can determine that a time-sensitive or important change request 302 has arrived which needs immediate attention and needs to be used to update the knowledge graph instantly.

In other words, new graph changes, i.e., change requests, are received from one or more users. First, each change is classified according to its locality. The locality is defined through the number of nodes and edges that are affected and the distance across the knowledge graph where the changes take place. For example, a change affecting only a few nodes and edges, all of which are in close proximity, is more local than one affecting many nodes and edges that are distributed all over the knowledge graph. Thus, locality quantifies the connectedness of the nodes and/or edges that are affected by a change. This classification happens via rules based on the locality that cluster changes based on actions (add, delete, change), number of touched nodes, number for affected connections, and/or affected area of the knowledge graph. In another implementation, supervised machine learning methods such as a Support Vector Machine may be used relying on similar features plus additional information like change topic and meta-data such as change requestor and change time.

Additionally, each change is assigned to a neighborhood/cluster. The knowledge graph is first clustered, which may again involve rules and machine learning. In particular, node and structural clustering methods may be used. Natural language processing can also be applied to the changes—if appropriate—in order to determine the best fit with regard to the clusters (i.e., sub-regions). This can happen periodically, whenever a certain number of change layers with a certain total complexity have been incorporated or after a certain period of time, whichever is sooner. Thus, each neighborhood quantifies or groups nodes and edges that are related to one another (i.e., they are about the same topic) based on any suitable clustering approaches.

Each neighborhood, as determined by the clustering in the previous step, becomes one change layer. Based on a change's topic classification, it is assigned to the relevant change layer. In this fashion, load balance optimization is facilitated. In general, load balancing for graph applications can be accomplished through a variety of strategies concerning GPU threads. For example, each thread may be assigned to a set of nodes or a set of edges or a combination of nodes and edges. Thus, by having the change layers separated according to clusters, it becomes easier to allocate a thread to a certain set of nodes and edges.

Once the layer assignment of a change has been done, the change is incorporated into the change layer. This can happen by matching any nodes/edges (by labels and/or properties) which the change affects with those already in the change layer (the integration takes place both in the event of overlap and in the absence of overlap). The change layer thus incorporates multiple related changes. If the same node or edge is changed multiple times, each new change is included in the change layer so that the change layer always represents the most up-to-date version. This leads to a reduced number of high-frequency changes happening on the knowledge graph; instead, these changes are captured in the relevant change layer.

After each change request has been integrated into a change layer, a curation consolidation and splitting) of each change layer takes place, as will be described below.

Each change layer is assigned a complexity score. This score can include factors such as:
  Number of changes—the more changes at are included, the higher the layer's complexity;
  Locality—number of affected nodes and edges (existing ones and new ones) and their distribution (the more nodes and edges that are affected over a wider region, the lower the locality);
  Connectivity of the changes—starting from the nodes of one change, which of the nodes of other changes can be reached and how many nodes and edges must be traversed to reach them; and Frequency of the changes—change layers that often receive updates have a higher frequency.

The complexity score definition is taken as enabling art.

As mentioned, in order to optimize performance, it is important to maintain load balance across GPU threads. Therefore, via the complexity score that can be assigned to each change layer, load balancing can be more easily optimized as a suitable number of change layers can be assigned per thread. This may be one of the main performance advantages of using change layers.

A check is performed to ensure consistency and optimal division of the change layers, as follows: The goal is to create a set of change layers which are neither too simple nor too complex. Also, as mentioned, each change layer should not cover too many neighborhoods; the change layers shall—as far as possible—be mutually exclusive in terms of neighborhood. Initially, the consolidation trigger shall be based on the number of changes. This can include a comparison of whether any change layers affect the same or closely related nodes and edges. If this is the case, and if the change layers are both below a certain complexity score, the change layers are merged. In another implementation, one could consider historical information about their typical complexity levels. This would involve considerations such as preventing a change layer with a low complexity from being merged with another simple layer if one or both of those layers have historically often been fairly complex (and therefore, it may be likely that soon after merging they have to be split again).

Furthermore, each change layer above a certain level of complexity can undergo an unsupervised clustering analysis to check if splitting it into two or more separate change layers would be suitable. If there are multiple well-defined clusters within a change layer (quantified e.g., via the Dunn index) and if the resulting "offspring" change layers are above a certain curation threshold complexity, the change layer is split into multiple change layers—at least two.

It shall be noted that change layers may also be "closed." This may happen when a layer has exceeded a certain level of complexity but cannot be broken down into smaller layers. This layer therefore would only be updated until after it has been integrated.

In another implementation, an additional parameter that can be considered for change layer consolidation is the geographical distribution of incoming change requests. For example, there may be a natural grouping or clustering or caching of new changes that come in from, e.g., the USA vs. new ones that come in from, e.g., Europe.

As soon as "enough" change requests have been incorporated into one or more change layers, the process can move to the next step to allow those collected changes to be incorporated into the baseline knowledge graph. The threshold to determine when the collected number of changes are enough is user-configurable and can be based on the total number of changes, number of affected nodes and/or edges, number of change layers that exceed the complexity threshold in the earlier, elapsed time, e.g., since the last update, frequency of changes over time, number of closed layers, or any combination of these and others. Any other criteria to determine when to stop creating and consolidating changes into change layers may also be considered. Note that all or just a subset (e.g., the layers above some level of complexity) will be integrated.

In another implementation, a classification model like logistic regression based on supervised machine-learning using complexity of change layers as input parameter may be applied in order to predict when a change layer is likely to reach the integration threshold. This information may then be used to adapt the integration schedule. For instance, if the frequency of changes in a change layer is increasing or decreasing, that change layer may already be integrated much sooner or—in the contrary case—later.

Once the change layers are consolidated, the resulting output can be applied to the actual base knowledge graph snapshot. The difference between the change layer and the base knowledge graph is evaluated to determine which action tasks may be required. The action tasks can either be adding new information, updating existing information or just deleting nodes and/or edges that are not valid anymore.

Through the consolidated view of many micro change requests that are actually one change layer, we may follow neither a FIFO (first-in-first-out) nor a LIFO (last-in-first-out) update method, since independent changes are already reasoned about. With this approach, one can reduce the number of physical graph changes compared to actual incoming change requests, in particular, when they are about the same topic. In addition, the application of the incoming changes in the change layers may require less node or edge checking than always checking the entire knowledge graph. Updating the base knowledge graph using all the grouped change requests in the change layer may be different than a traditional bulk update mechanism since, in reality, the change layer contains multiple independent changes that are related (see initial step). Thus, the rest of the procedure is not the same as existing bulk update mechanisms.

Therefore, it is possible to reduce the load on the knowledge graph by the following merge operations in a smaller and already predefined environment instead of singular add/delete/modify actions in the knowledge graph. In the end, the injection of the change layer consists of much less changes than the actual change requests that were coming in in the first place.

The changes that may be grouped together in a change layer can now be applied to the base knowledge graph to allow the creation of an updated snapshot. The updating process may proceed as follows:

Identify the sub-parts of the knowledge graph that pertains to the change layer. This may be implementation-dependent (i.e., partitioning like or sharding like subdivisions of the graph, distributed graph locations, etc.), and focusing updates only on the identified sub-parts of the graph to reduce disruption and increase updating speed. In most existing knowledge graphs, this may be a standard functionality.

For each vertex $V_i$ in the change layer, group vertices as either create ($V_c$), update ($V_u$), or delete ($V_d$), e.g., similar to CUD (create/update/delete) from CRUD (create/read/update/delete).

For each edge $E_j$ in the change layer, determine which edges constitute new edges that must be created ($E_c$), updated ($E_u$) or deleted ($E_d$).

Use existing knowledge graph tooling to:
 Delete all outdated vertices in $V_d$;
 Create all new vertices $V_c$;
 Update existing vertices $V_u$;
 Create all new edges $E_c$;
 Delete all outdated edges $E_d$; and
 Update all existing edges $E_u$ The above step may result in conflicts and/or errors such as:
 Creating a new vertex or edge when the vertex or edge already exists. In that case, overwrite the existing vertex or edge.

Deleting a vertex or edge when the vertex or edge does not exist. In this case, ignore the deleted vertex or edge.

Updating a vertex or edge when the vertex or edge does not exist. In this case, turn the update statement into a create statement.

Drop the change layer since all changes are now merged into the base knowledge graph.

Update the snapshot pointer to the current base knowledge graph.

This process may be repeated until all change layers that were ready for integration have been incorporated. The order of integration is not critical since, as mentioned in the step explained above, the change layers generally cover different neighborhoods. Therefore, the order rule can simply be set such that, for example, the change layers which were first closed or first identified as ready for integration, are actually integrated first. In this manner, in case there is a small degree of overlap between the change layers, the change layers with later updates are integrated after the layers with earlier updates. Should larger degrees of overlap require more complex methods of determining which changes should prevail, special methods may be applied advantageously.

As soon as all the identified action tasks are executed, the base knowledge graph may be up-to-date for the injected change layer. This new state may then be considered a new snapshot of the information at this very specific point in time. Therefore, it can happen that only a subset of change layers are incorporated, as those that are scheduled for the future are to be kept in the backlog.

Last but not least, storing incoming information in change layers before creating a snapshot can lead to a delay of updating the knowledge graph with the newest information. Thus, exemptions need to be made when very frequent, but at the same time very crucial, information may be coming in. This means that data that a user might have an urgent need to know about needs to be detected, and then depending on the configuration, treated differently. Predictive models may help to assess whether a piece of information is time-critical for the user, as well as the query possibilities. Through a machine-learning approach, incoming change requests can be rated based on historic analysis to detect time-critical information that may then circumvent the change layer—snapshot method by either triggering a direct knowledge graph update or getting its own change layer and snapshot with a different configuration that may lead to earlier knowledge graph updates.

In an extension, it may be possible to leverage the information around the importance of changes in order to delete information that is very unlikely to be of further use in the future. The goal may be to further optimize the quantity of data stored and the performance. For example, snapshots comprising most minor of changes may be deleted. It should also be noted that redundant information, e.g., individual changes after their assignment to change layers and change layers that have been integrated into the knowledge graph may be deleted in order to achieve optimized storage and performance.

FIG. 4 is a block diagram 400 of change in different stages of the knowledge graph and its change layers. The diagram 400 shows a snapshot 1 at a time t=0, 402, change layers 1 at t=1, 404, change layer at t=2, 406, a second snapshot 2 at t=3, 408, and change layer 3 at t=4, 410. Furthermore, a larger knowledge graph structure 412 is shown symbolically. Additionally, on the left side of snapshot 402—which is for simplicity reasons not connected to the larger knowledge graph structure 412—an exemplary small portion of the knowledge graph is illustrated.

Thereby, the following relationships are built between the shown nodes (illustrated as circuits):
node 414=company,
node 416=person a,
node 418=person b,
relationship 420=works at,
relationship 422=CEO of,
relationship 424, 426=lives at,
node 428=a country.

Change layer 404 has the following as incoming change requests:
node 430=ID 54545,
node 432=ID 12345,
node 434=ID 98765,
relationship 436=DELETA "works at"; ADD "CEO of",
relationship 438=DELETE "CEO of".

Change layer 406 has the following as incoming change request for the relationship 438 of the nodes 430 and 434: ADD "chairman of."

As a consequence, after a consolidation of change layer 404 and change layer 406 and in integration into the knowledge graph according to snapshot 402, the relationship between the exemplary discussed nodes 414, 416, 418, and 428 is:
relationship 440=CEO of,
relationship 442=chairman of.

Hence, person a and person b have mutually exchanged their positions within the company 414.

Snapshot 410 has now the incoming change request for node 430 having the value "ID 54545" (i.e., the company) and the person with the "ID 98765" of node 434: relationship 444: DELETE "chairman of."

Hence, person b—in its last position being the chairman of the company 414—has left the company 414.

This change can be integrated into the snapshot 408 in a next integration of change layers—in particular change layer 410—to build a new updated snapshot 3.

FIG. 5 is a block diagram of the knowledge graph system 500 for managing updates for a knowledge graph with incoming change requests according to at least one embodiment. The system 500 comprises a processor 502 and a memory 504, communicatively coupled to the processor 502, wherein the memory 504 stores program code portions that, when executed, enable the processor 502, to create—in particular, by a snapshot creating unit 506—a snapshot of the knowledge graph, to build sub-regions—in particular, by a sub-regions creation unit 508—of the knowledge graph, and to classify—in particular, by a classifier 510—each incoming change to the knowledge graph so that it relates to one of the sub-regions.

The processor can also be enabled to create—in particular, by a change layer creation unit 512—at least one change layer, wherein each of the at least one change layers relates to one of the sub-regions, wherein each of the at least one change layers comprises a portion of the incoming change requests, to close—in particular, a closing module 514—the at least one change layer upon reaching a predetermined threshold value for the at least one change layer, and to integrate—in particular, an update unit 516—the at least one change layer—or better the change request in the change layer—into the knowledge graph, thereby generating an updated knowledge graph.

It shall also be mentioned that all functional units, modules and functional blocks—in particular, the processor 502, the memory 504, the snapshot creating unit 506, the sub-regions creation unit 508, the classifier 510, the change layer creation unit 512, the closing module 514 and the update unit 516—may be communicatively coupled to each other for signal or message exchange in a selected 1:1 manner. Alternatively the functional units, modules and functional blocks can be linked to a system internal bus system 518 for a selective signal or message exchange.

Embodiments of the invention may be implemented together with virtually any type of computer, regardless of the platform being suitable for storing and/or executing program code. FIG. 6 shows, as an example, a computing system 600 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth hereinabove. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of the computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

Additionally, the knowledge graph system 500 for managing updates for a knowledge graph with incoming change requests may be attached to the bus system 606.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the C programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

It is to be understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and change layer update 1156. A change layer update program 110a, 110b provides a way to optimize the storage requirements needs for historical data and knowledge graphs and to reduce the number of update calls to a knowledge graph.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms a, an and the are intended to include the plural forms as well, unless the context clearly indicates otherwise. It will further be understood that the terms comprises and/or comprising, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for managing updates for a knowledge graph with incoming change requests, the method comprising:
    creating a snapshot of the knowledge graph;
    building a plurality of sub-regions of the knowledge graph;
    classifying each incoming change request to the knowledge graph so that the incoming change request relates to one of the plurality of sub-regions;
    creating at least one change layer, wherein the at least one change layer relates to the one of the plurality of sub-regions, and wherein the at least one change layer comprises a portion of the incoming change requests;
    closing the at least one change layer upon reaching a predetermined threshold value for the at least one change layer;
    integrating the at least one change layer into the knowledge graph, thereby generating an updated knowledge graph, wherein an integration threshold comprises at least one selected from the group consisting of a total number of changes, a number of affected nodes or edges, a number of change layers that exceed a complexity threshold, an elapsed time, a frequency of changes over time, and a number of closed layers; and
    tracking a clear version history of the at least one change layer in the knowledge graph.

2. The computer-implemented method of claim 1, further comprising:
    creating an updated snapshot of the updated knowledge graph.

3. The computer-implemented method of claim 1, further comprising:
    consolidating the at least one change layer in accordance with a complexity score which is determined using at least one function argument selected from the group consisting of a number of required changes, a locality value of a change, a mutual dependency of changes, and a historical frequency of changes.

4. The computer-implemented method of claim 3, wherein the consolidation comprises at least one selected from the group consisting of a merge change layer, a splitting an existing change layer, a closing a change layer, and an opening a new change layer.

5. The computer-implemented method of claim 1, wherein the knowledge graph is directly updated by a time-sensitive incoming change request or important incoming change request without a use of a change layer.

6. The computer-implemented method of claim 1, wherein a determination regarding a time-sensitivity or an importance of the incoming change request is performed by a trained machine-learning system.

7. The computer-implemented method of claim 1, wherein the plurality of sub-regions of the knowledge graph are built using an unsupervised machine-learning method.

8. The computer-implemented method of claim 1, wherein a consolidation results in a plurality of new sub-regions.

9. The computer-implemented method of claim 1, further comprising:
consolidating the change requests in the at least one change layer comprising at least one function argument selected from the group consisting of a merging change request, a splitting a change request, a deleting a change request, and a creating a change request.

10. A computer system for managing updates for a knowledge graph with incoming change requests, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
creating a snapshot of the knowledge graph;
building a plurality of sub-regions of the knowledge graph;
classifying each incoming change request to the knowledge graph so that the incoming change request relates to one of the plurality of sub-regions;
creating at least one change layer, wherein the at least one change layer relates to the one of the plurality of sub-regions, and wherein the at least one change layer comprises a portion of the incoming change requests;
closing the at least one change layer upon reaching a predetermined threshold value for the at least one change layer; and
integrating the at least one change layer into the knowledge graph, thereby generating an updated knowledge graph, wherein an integration threshold comprises at least one selected from the group consisting of a total number of changes, a number of affected nodes or edges, a number of change layers that exceed a complexity threshold, an elapsed time, a frequency of changes over time, and a number of closed layers; and
tracking a clear version history of the at least one change layer in the knowledge graph.

11. The computer system of claim 10, further comprising:
creating an updated snapshot of the updated knowledge graph.

12. The computer system of claim 10, wherein the processor is further enabled to consolidate the incoming change requests in the at least one change layer in accordance with a complexity score which is determined using at least one function argument selected from the group consisting of a number of required changes, a locality value of a change, a mutual dependency of changes, and a frequency of changes.

13. The computer system of claim 12, wherein the consolidation comprises at least one from the group consisting of a merging change layer, a splitting an existing change layer, a closing a change layer, and an opening a new change layer.

14. The computer system of claim 10, wherein the knowledge graph is directly updated by a time-sensitive incoming change request or an important incoming change request without a use of a change layer.

15. The computer system of claim 10, wherein a determination regarding a time-sensitivity or an importance of an incoming change request is performed by a trained machine-learning system.

16. The computer system of claim 10, wherein the plurality of sub-regions of the knowledge graph are built using an unsupervised machine-learning method.

17. The computer system of claim 10, wherein a consolidation results in a plurality of new sub-regions.

18. A computer program product for managing updates for a knowledge graph with incoming change requests, comprising:
one or more non-transitory computer-readable storage media and program instructions stored on at least one of the one or more tangible storage media, the program instructions executable by a processor to cause the processor to perform a method comprising:
creating a snapshot of the knowledge graph;
building a plurality of sub-regions of the knowledge graph;
classifying each incoming change request to the knowledge graph so that the incoming change request relates to one of the plurality of sub-regions;
creating at least one change layer, wherein the at least one change layer relates to the one of the plurality of sub-regions, and wherein the at least one change layer comprises a portion of the incoming change requests;
closing the at least one change layer upon reaching a predetermined threshold value for the at least one change layer; and
integrating the at least one change layer into the knowledge graph, thereby generating an updated knowledge graph, wherein an integration threshold comprises at least one selected from the group consisting of a total number of changes, a number of affected nodes or edges, a number of change layers that exceed a complexity threshold, an elapsed time, a frequency of changes over time, and a number of closed layers; and
tracking a clear version history of the at least one change layer in the knowledge graph.

* * * * *